(12) United States Patent
Jennings et al.

(10) Patent No.: US 7,617,268 B2
(45) Date of Patent: Nov. 10, 2009

(54) METHOD AND APPARATUS SUPPORTING NON-ADDITIVE CALCULATIONS IN GRAPHICS ACCELERATORS AND DIGITAL SIGNAL PROCESSORS

(75) Inventors: Earle Jennings, Kensington, CA (US); George Landers, Tigard, OR (US); Robert Spence, San Leando, CA (US)

(73) Assignee: QSigma, Inc., Sunnyvale, CA (US)

( * ) Notice: Subject to any disclaimer, the term of this patent is extended or adjusted under 35 U.S.C. 154(b) by 1098 days.

(21) Appl. No.: 11/036,538

(22) Filed: Jan. 13, 2005

(65) Prior Publication Data

US 2005/0182811 A1 Aug. 18, 2005

Related U.S. Application Data

(63) Continuation-in-part of application No. 10/678,570, filed on Oct. 3, 2003, now Pat. No. 7,284,027, which is a continuation-in-part of application No. 10/226,735, filed on Aug. 22, 2002, which is a continuation-in-part of application No. 10/276,414, filed as application No. PCT/US01/15541 on May 14, 2001.

(60) Provisional application No. 60/605,224, filed on Aug. 26, 2004, provisional application No. 60/562,493, filed on Apr. 14, 2004, provisional application No. 60/536,745, filed on Jan. 14, 2004, provisional application No. 60/454,755, filed on Mar. 14, 2003, provisional application No. 60/470,100, filed on May 12, 2003, provisional application No. 60/402,346, filed on Aug. 9, 2002, provisional application No. 60/365,416, filed on Mar. 18, 2002, provisional application No. 60/361,637, filed on Mar. 3, 2002, provisional application No. 60/325,093, filed on Sep. 25, 2001, provisional application No. 60/314,411, filed on Aug. 22, 2001, provisional application No. 60/282,093, filed on Apr. 6, 2001, provisional application No. 60/261,066, filed on Jan. 11, 2001, provisional application No. 60/231,873, filed on Sep. 12, 2000, provisional application No. 60/217,353, filed on Jul. 11, 2000, provisional application No. 60/215,894, filed on Jul. 5, 2000, provisional application No. 60/204,113, filed on May 15, 2000.

(51) Int. Cl.
*G06F 7/38* (2006.01)
*G06F 7/552* (2006.01)

(52) U.S. Cl. .................. 708/605; 708/606; 708/505

(58) Field of Classification Search ......... 708/605–606, 708/500, 502, 517, 277
See application file for complete search history.

(56) References Cited

U.S. PATENT DOCUMENTS

| | | | | |
|---|---|---|---|---|
| 6,480,873 | B1 * | 11/2002 | Inoue et al. | 708/606 |
| 6,678,710 | B1 * | 1/2004 | Shankar et al. | 708/517 |
| 6,976,043 | B2 * | 12/2005 | Clifton | 708/277 |

* cited by examiner

*Primary Examiner*—Tan V Mai
(74) *Attorney, Agent, or Firm*—Earle Jennings (57) ABSTRACT

A method and apparatus receiving number and using instruction to create resulting number approximating one of square root, reciprocal, or reciprocal square root of number. The resulting number as a product of that process. Using resulting number in a graphics accelerator. Apparatus preferably includes log-calculator, log-arithmetic-unit, and exponential-calculator. At least one of log-calculator and exponential-calculator include implementation non-linear calculator. The non-linear calculators may use at least one of mid-band-filter, outlier-removal-circuit. The invention includes making arithmetic circuit, log-calculator, log-arithmetic-unit and exponential-calculator. The arithmetic circuit, log-calculator, log-arithmetic-unit and exponential-calculator as products of manufacture. The arithmetic circuit may further include at least one of a floating-point-to-log-converter and/or a second of log-calculators. The arithmetic circuit may further include third and fourth log-arithmetic-units providing altered log domain numbers to third and fourth exponential calculators.

27 Claims, 7 Drawing Sheets

METHOD AND APPARATUS SUPPORTING NON-ADDITIVE CALCULATIONS IN GRAPHICS ACCELERATORS AND DIGITAL SIGNAL PROCESSORS

CROSS-REFERENCE TO RELATED PATENT APPLICATIONS

This application claims priority from the following U.S. provisional patent application Ser. Nos. 60/605,224, filed Aug. 26, 2004, Ser. No. 60/562,493, filed Apr. 14, 2004, Ser. No. 60/536,745, filed Jan. 14, 2004;

This application claims priority as a continuation-in-part from the U.S. patent application Ser. No. 10/678,570 now U.S. Pat. No. 7,284,027, filed Oct. 3, 2003, which claims priority from the following provisional patent application Ser. Nos. 60/454,755, filed Mar. 14, 2003, and Ser. No. 60/470,100, filed May 2, 2003;

This application also claims priority as a continuation-in-part from the pending U.S. patent application Ser. No. 10/226,735, filed Aug. 22, 2002, which claims priority from following provisional application Ser. Nos. 60/402,346, filed Aug. 9, 2002, Ser. No. 60/365,416, filed Mar. 18, 2002, Ser. No. 60/361,637, filed Mar. 3, 2002, U.S. Ser. No. 60/325,093, filed Sep. 25, 2001, Ser. No. 60/314,411, filed Aug. 22, 2001;

Which is a continuation in part of Ser. No. 10/276,414, filed Nov. 12, 2002, which is the national stage application based upon PCT US01/15,541, filed May 14, 2001, which further claims priority from the following U.S. provisional application Ser. Nos. 60/282,093, filed Apr. 6, 2001, Ser. No. 60/261,066, filed Jan. 11, 2001, Ser. No. 60/231,873, filed Sep. 12, 2000, Ser. No. 60/217,353, filed Jul. 11, 2000, Ser. No. 60/215,894, filed Jul. 5, 2000, and Ser. No. 60/204,113 filed May 15, 2000.

TECHNICAL FIELD

The technical field of the invention includes arithmetic circuits, in particular arithmetic circuits providing square root, as well as reciprocal and reciprocal square root based upon an instruction. The invention also includes arithmetic circuits calculating non-linear functions such as logarithm and exponential using corrector circuitry, as well as providing range-limited approximations of sine and cosine, and the multiplication of more than two operands.

BACKGROUND OF THE INVENTION

This invention addresses weaknesses found in at least both Digital Signal Processors (DSP) and graphics accelerators. One problem found in both contemporary graphics accelerators and DSP's is the real time calculation of square roots. This must be done by applying both the operations of reciprocal and of reciprocal square root. These may be performed in either order. However, square root, which is essential for calculating distances in many applications take twice as long as either reciprocal or reciprocal square root. This adds complexity to the software support of applications.

There are a variety of performance bottlenecks and complexity hurtles facing contemporary graphics accelerators. These problems are outlined in the "Background of the Invention" of U.S. provisional application Ser. No. 60/470,100, and incorporated herein by reference. They are further discussed in the "Introduction" of U.S. Provisional Application Ser. No. 60/536,745, and incorporated herein by reference. They are also discussed in the sections "Introduction", "Datapath Architecture Problems for Compilers", "Datapath Performance Requirements", and "An example contemporary shader core datapath" of U.S. Provisional Application Ser. No. 60/562,493, and incorporated herein by reference.

Figure 1A:
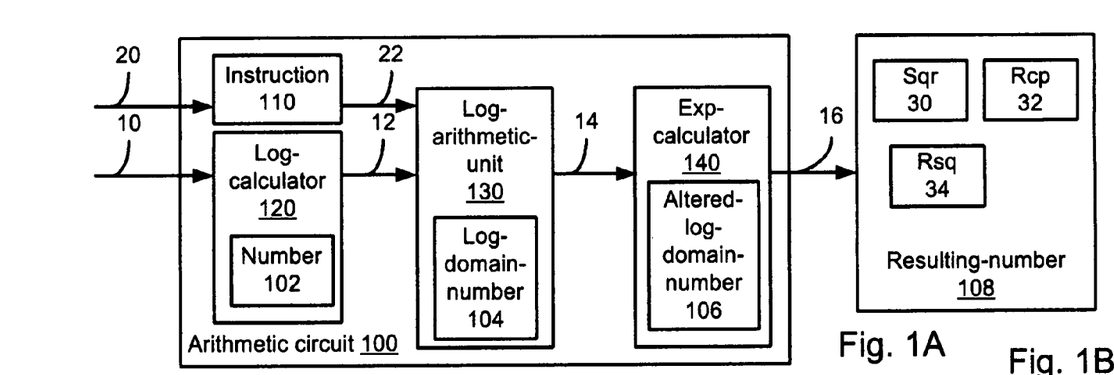
FIG. 1A shows schematic diagram of an arithmetic circuit incorporating the invention.

DSP Processors are discussed and defined with regards FIG. 1A and the associated text in U.S. application Ser. No. 10/276,735, which is incorporated herein by reference. Further, efficient calculation of a number of common functions are not readily available in contemporary Digital Signal Processors, as is disclosed in the "Background of the Invention" of U.S. patent application Ser. No. 10/226,735, and incorporated herein by reference.

To summarize, there is a commonly experienced problem regarding real-time calculation of square roots in both DSP and graphics accelerators. Each of these areas has a variety of additional problems either in performance, application software support, or both.

SUMMARY OF THE INVENTION

The invention includes a method and apparatus receiving a number and using an instruction to create a resulting number. A resulting number is an approximation of one of the square root, reciprocal, or reciprocal square root of the number. The makes the real-time calculation of square roots as efficient as the calculation of either reciprocal or reciprocal square roots. Additionally, the invention insures that the square root of zero is exactly zero, which cannot be assured by prior art approaches to logarithmic calculators.

The number may preferably be in a floating point format. The floating point format may be a 32 bit format, which may or may not be compatible with the IEEE 754 floating point standard. In certain preferred embodiments, the number may also support a second floating point format, which may support two sub-numbers in a 16 bit floating point format. The resulting number also includes two sub-results, each of the sub-results are the approximation of the corresponding sub-number, as indicated by the instruction.

The invention includes the resulting number as a product of process receiving the number and instruction. The invention further includes the use of the resulting number in a graphics accelerator to, at least partly, create a vertex and/or a pixel included in a frame. The frame includes at least one of a one-dimensional, two-dimensional and/or three-dimensional array of pixels. The graphics accelerator provides the frame for visual presentation by at least one display. The display may provide a two-dimensional and/or a three-dimensional and/or holographic visual presentation.

The apparatus of the invention may preferably include a log-calculator, a log-arithmetic-unit, and an exponential-calculator. The log-calculator receives said number to create a log-domain-number containing a fixed-point-part. The log-arithmetic-unit receives said log-domain-number and said instruction to create an altered-log-domain-number. And the exponential-calculator receiving said altered-log-domain-number to create said resulting-number.

At least one of the log-calculator and the exponential-calculator include an implementation of a non-linear calculator. The implementations preferably deal with the fractional and/or mantissa components of the input and output of these calculators.

The invention further includes non-linear calculators using at least one of a mid-band-filter and/or an outlier-removal-circuit, which are experimentally shown to improve precision of log-calculators and exponential-calculators.

The invention includes making the arithmetic circuit, the log-calculator, the log-arithmetic-unit and the exponential-calculator. The invention includes the arithmetic circuit, the log-calculator, the log-arithmetic-unit and the exponential-calculator as the product of its manufacture. The manufacturing process may include at least one of using a Field-Programmable-Gate-Array, a gate-array-layout-template, a standard-cell-process, a molecular-module-process, and/or a single-electron-switch-process.

The arithmetic circuit may further include at least one of a floating-point-to-log-converter and/or a second of said log-calculators. The log-arithmetic-unit may receive the log-domain-numbers from them to further create the altered-log-domain-number. The arithmetic circuit may further include a second log-arithmetic-unit receiving at least one log domain input number to create a second altered-log-domain-number, provided to a second exponential-calculator to create a third-resulting-number.

The arithmetic circuit may further include third and fourth log-arithmetic-units providing altered log domain numbers to third and fourth exponential calculators. The resulting numbers from the exponential calculators may provide the active terms for range limited versions of sine and cosine, as well the products needed to form the complex number products of the complex input formed of the first number and the third number. The complex number product involves the complex input multiplied by a second complex number whose numeric components are provided in log-domain-format. The arithmetic circuit may further include adders forming the sine and/or cosine approximation, and/or providing the complex number product to at least one adder to support radix-4 and higher steps for Fast Fourier Transforms (FFTs)

BRIEF DESCRIPTION OF THE DRAWINGS

FIGS. 3A to 5B show various embodiments of non-linear calculators, which may be included in the log-calculator and/or the exponential-calculator of FIG. 1A; and FIGS. 6A to 7 show various embodiments of the arithmetic circuit of FIG. 1A.

DETAILED DESCRIPTION

The invention includes a method and apparatus receiving a number and using an instruction to create a resulting number. A resulting number is an approximation of one of the square root, reciprocal, or reciprocal square root of the number. The makes the real-time calculation of square roots as efficient as the calculation of either reciprocal or reciprocal square roots. Additionally, the invention insures that the square root of zero is exactly zero, which cannot be assured by prior art approaches to logarithmic calculators.

The apparatus of the invention may preferably include a log-calculator, a log-arithmetic-unit, and an exponential-calculator. The log-calculator receives said number to create a log-domain-number containing a fixed-point-part. The log-arithmetic-unit receives said log-domain-number and said instruction to create an altered-log-domain-number. And the exponential-calculator receiving said altered-log-domain-number to create said resulting-number.

The number may preferably be in a floating point format. The floating point format may be a 32 bit format, which may or may not be compatible with the IEEE 754 floating point standard. In certain preferred embodiments, the number may also support a second floating point format, which may support two sub-numbers in a 16 bit floating point format. The resulting number also includes two sub-results, each of the sub-results are the approximation of the corresponding sub-number, as indicated by the instruction.

FIG. 1A shows the invention including an arithmetic circuit 100 first-receiving 10 at least one number 102 and an instruction 110 to create a resulting-number 108. The arithmetic circuit 100 preferably approximates one of a square-root 30 of the number 102, a reciprocal 32 of the number 102 and a reciprocal-square-root 34 of the number 102 with the resulting-number 108. The resulting-number 108 is a product of operating the arithmetic circuit 100.

Figure 1B:
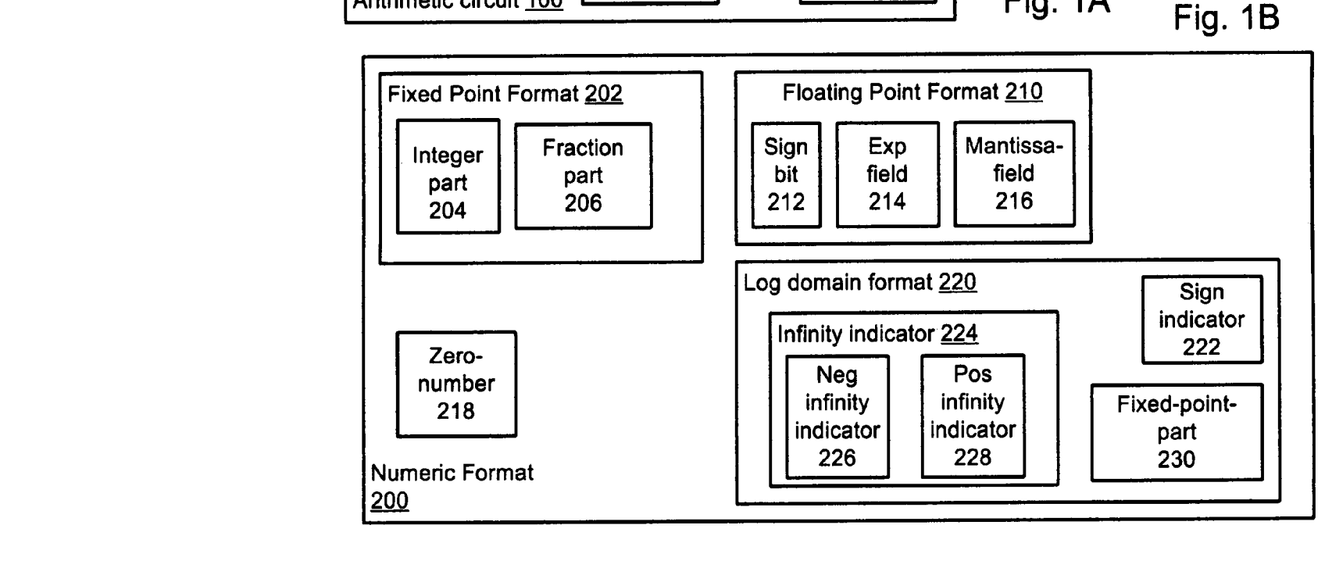
FIG. 1B shows some examples of numeric formats used in various embodiments of the invention.
Figure 2A:
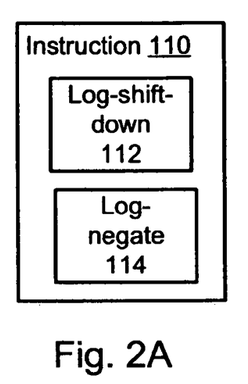
FIGS. 2A and 2D show embodiments of the instruction of FIG. 1A.

When said instruction 110 indicates a log-shift-down 112, as in FIG. 2A, said resulting-number 108 approximates said square-root 30 of said number 102, and when said number 102 is said zero-number 218, as in FIG. 1B, said resulting-number 108 is the zero-number 218, as shown in FIG. 1B. Note that preferably, each numeric format 200 in FIG. 1B includes at least one zero-number 218. As used herein, within each numeric format, all representations of the zero-number will be assumed to be equal, so that saying that the number 102 is the zero-number and that the resulting-number 108 is the zero-number does not mean that their bits are identical, but that they both represent the zero-number. FIG. 1B shows the numeric format 200 may include a log domain format 220 that may further include an infinite indicator 224, a sign indicator 222 and a fixed-point-part 230. The sign indicator 222 may include a negative infinity indicator 226 or a positive infinity indicator 228.

When said instruction 110 indicates a log-shift-down 112 and said instruction indicates a log-negate 114, said resulting-number 108 approximates said reciprocal-square-root 34 of said number 102.

When said instruction 110 indicates said log-negate 114, said resulting-number 108 approximates said reciprocal 32 of said number 102.

The invention further includes operating the arithmetic circuit 100 of FIG. 1A as follows. A log-calculator 120 receives said number 102 to create a log-domain-number 104 containing a fixed-point-part 230, as illustrated in FIG. 1B for a numeric format 200, in particular, as part of a log-domain-format 220. The log-domain-number 104 may further include a negative infinity indicator 226 that is asserted when said number 102 is the zero-number. A log-arithmetic-unit 130 receives said log-domain-number 104 and said instruction 110 to create an altered-log-domain-number 106, with said altered-log-domain-number including a negative infinity indicator matching the negative infinity indicator of the log-domain-number when said instruction indicates a log-shift-down 112 and said instruction does not indicate a log-negate 114. And an exponential-calculator 140 receiving said altered-log-domain-number 106 to create said resulting-number 108, making said resulting-number the zero-number when the negative infinity indicator is asserted. The overall operation of the arithmetic circuit is further discussed under the topic of the "Integrated Function Module" in Provisional Patent Application 60/605,224, which is incorporated herein by reference.

Figure 2B:
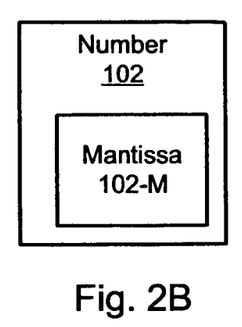
FIGS. 2B and 2E show embodiments of the number of FIG. 1A.
Figure 2C:
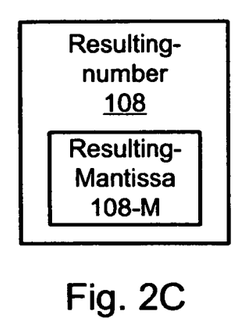
FIGS. 2C and 2F show embodiments of the resulting-number of FIG. 1A.

In what follows, the discussion will focus on floating point arithmetic formats. However, the invention applies as well to fixed point arithmetic. In certain preferred embodiments of the invention, at least one of said number 102 and said resulting-number 108 is a floating-point-format-number 210, as shown in FIG. 1A. As used herein, a floating-point-format-number 210 preferably includes a sign bit 212, an exponent field 214, and a mantissa-field 216. It may be further preferred that both said number 102 and said resulting-number 108 is a floating-point-format-number 210. Further, it may be preferred that said number 102 includes a mantissa 102-M as in FIG. 2B, and said resulting-number 108 includes a resulting-mantissa 108-M as in FIG. 2C. Further, the bit-size of said mantissa 102-M may preferably be the same as the bit-size of said resulting-mantissa 108-M.

Figure 2D:
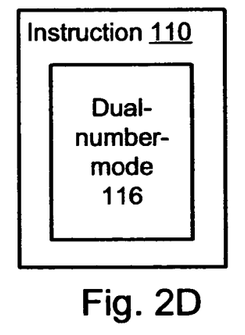
Figure 2E:
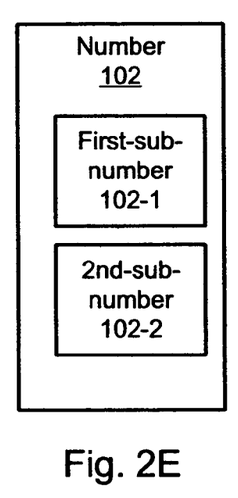
Figure 2F:
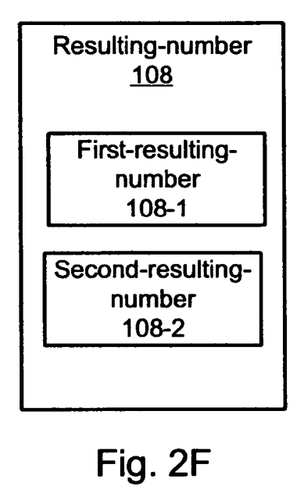

In certain embodiments, when said instruction 110 indicates a dual-number-mode 116 as in FIG. 2D, the number 102 represents a first-sub-number 102-1 and a second-sub-number 102-2, as in FIG. 2E. The resulting-number 108 represents a first-resulting-number 108-1 and a second-resulting-number 108-2. A discussion of support for dual numeric formats is further found in Provisional Patent Application 60/605,224, which is incorporated herein by reference.

When said instruction 110 indicates the dual-number-mode 116 and when said instruction indicates said log-shift-down 112, the first-resulting-number 108-1 approximates said square-root 30 of said first-sub-number 102-1, and said second-resulting-number 108-2 approximates said square-root 30 of said second-sub-number 102-2.

When said instruction 110 indicates the dual-number-mode 116 and when said instruction indicates said log-negate 114, said first-resulting-number 108-1 approximates said reciprocal 32 of said first-sub-number 102-1, and said second-resulting-number 108-2 approximates said reciprocal 32 of said second-sub-number 102-2.

When said instruction 110 indicates said dual-number-mode 116 and indicates said log-shift-down 112 and said log-negate 114, said first-resulting-number 108-1 approximates said reciprocal-square-root 34 of said first-sub-number 102-1, and said second-resulting-number 108-2 approximates said reciprocal-square-root 34 of said second-sub-number 102-2.

At least one of the log-calculator and the exponential-calculator include an implementation of a non-linear calculator. The implementations preferably deal with the fractional and/or mantissa components of the input and output of these calculators.

Returning to the discussion of FIG. 1A, the arithmetic circuit 100 includes a log-calculator 120 first-receiving 10 said number 102 to create a log-domain-number 104 containing a fixed-point-part 230. A log-arithmetic-unit 130 log-alu-receives 12 said log-domain-number 104 and log-alu-inst-recieves 22 said instruction 110 to create an altered-log-domain-number 106. Equivalently, the log-calculator 120 provides said log-domain-number 104 via a first-coupling 12 to said log-arithmetic-unit 130.

The exponential-calculator 140 exp-receives 14 said altered-log-domain-number 106 to create said resulting-number 108. Equivalently, said log-arithmetic-unit 130 provides said altered-log-domain-number 106 via a second-coupling 14 to said exponential-calculator 140.

The invention further includes non-linear calculators using at least one of a mid-band-filter and/or an outlier-removal-circuit, which are experimentally shown to improve precision of log-calculators and exponential-calculators.

The invention includes making the arithmetic circuit, the log-calculator, the log-arithmetic-unit and the exponential-calculator. The invention includes the arithmetic circuit, the log-calculator, the log-arithmetic-unit and the exponential-calculator as the product of its manufacture. The manufacturing process may include at least one of using a Field-Programmable-Gate-Array, a gate-array-layout-template, a standard-cell-process, a molecular-module-process, and/or a single-electron-switch-process.

In certain embodiments of the invention, the log-calculator includes a first circuit, which deals with the exponent part of the number 102, when the number is a floating point number. A second circuit deals with the mantissa as an input-number 702. The log-calculator 120 comprises the second circuit as a first implementation of a non-linear calculator 700 receiving the input-number 702 derived from said number 102 to create an output-number 708 including said fixed-point-part 230. In certain, possibly distinct, said exponential-calculator 140 comprises a second implementation of said non-linear calculator 700 receiving said input-number 702 derived from said altered-log-domain-number 106 to create the output-number 708 included in said resulting-number 108.

Basically, log-calculators and exp-calculators can be decomposed into two circuits, a first circuit which deals with the exponent/integer part of an input number and a second circuit, which deals with the mantissa or fractional part of an input.

For the moment, the formats of the number 102 and the resulting-number 108 will be assumed to be $FP_{32}$, which assumes a 32 bit floating point number with a 23 bit mantissa 102-M which will be mathematically denoted as $X_f$, a single sign bit denote as Sign, and an 8 bit exponent field 214, denoted as $X_e$. Leaving aside the issues of denormals, infinities, Not-A-Number and the exact coding of a zero-number, the number 102 be represented as $(-1)^{sign} 2^{X_e - 128} (1 + X_f/2^{23})$, the first circuit of a log-calculator subtracts 128 from the exponent field for the integer part of the fixed-point-part 230. The second circuit of the log-calculator performs the following calculation $Log_2(1 + X_f/2^{23})$. This second circuit is preferably implemented as a non-linear calculator. These second circuits implement approximations, which will sometimes be referred to herein and in the incorporated references as approximators.

The altered-log-domain-number 106 includes a fixed-point-part denoted as $X_e + X_f$. The first circuit delivers an exponent field with $X_e + 128$ to the resulting-number 108. The second circuit delivers the mantissa as $2^{X_f} - 1$. This second circuit is also preferably implemented as a non-linear calculator.

FIGS. 3A to 4B show various embodiments of various implementations of a non-linear calculator 700, where the input-number 702 includes a first-part-number 702-1 and a second-part-number 702-2. Each of these embodiments includes at least one table 620 accessed 121 by the first-part-number 702-1 to create at least one offset-value 622-1 and a base-value 622-0. A part-mult-circuit 630 receiving said offset-value 622-1 and the second-part-number 702-2 to create at least one scaled-part-value 616. A part-add-circuit 640 receiving said base-value 622-0 and said at least one scaled-part-value 616 to create said output-number 708.

Figure 5A:
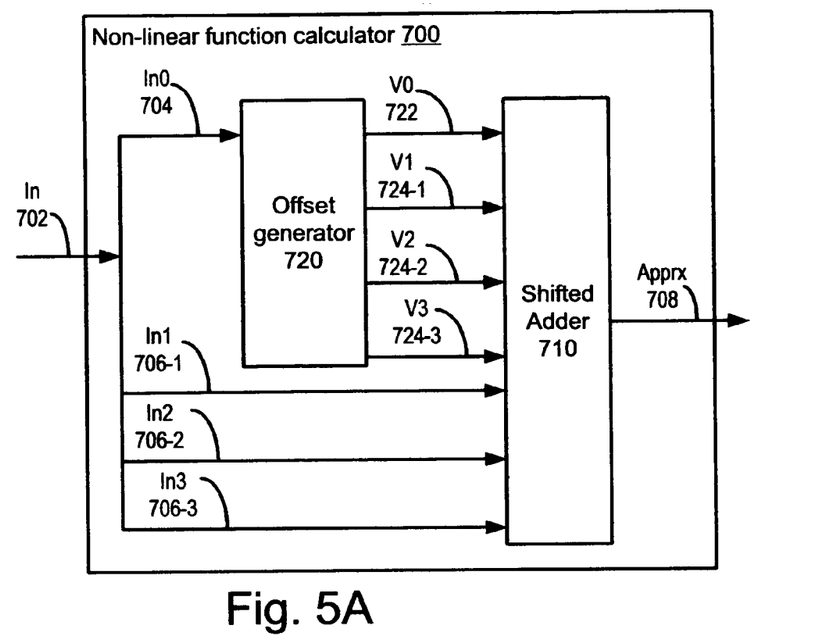
Figure 5B:
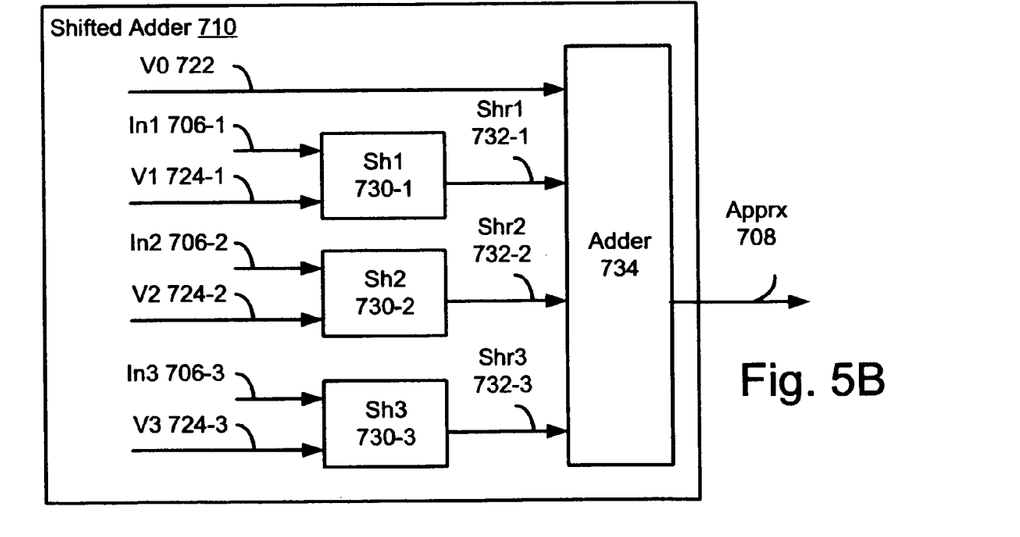

FIG. 5A shows an alternative implementation of a non-linear calculator 700. Based upon using small bit multipliers implemented by shifting the table-offsets as shown in FIG. 5B. Implementations of these approximators, both with and without the aid of outlier-removal-circuits and mid-band-filters is further discussed in the incorporated references. The sections "LC Internal Block Diagram for Fraction Calculator" and "EC Internal Block Diagram for Mantissa Calculator" in Ser. No. 60/605,224 specifically discuss the support for dual-mode arithmetic formats in the log-calculator 120 and exponential-calculator 140.

The implementations can be described in terms of an input number with H high bits and N pairs of bits making up the remaining bits of the input number. This leads to $$Xf = Xh/2^H + \sum_{i=1}^{N} Xp[i]2^{-2i-H} \quad (1.1)$$

Xh is used to index tables $G_i$, for i=0 to N. A first order approximation will refer herein to a base term $G_0$ to N terms of $G_i$ times small bit multipliers m(Xp[i]), m ranges in value over $\{-\frac{1}{2}, 0, \frac{1}{2}, 1\}$ for a two bit input Xp[i]. Let $f(X_f)$ be the function to be approximated, which in several preferred embodiments is often the range limited function of the second circuit as discussed above. As shown in the next formula F is an approximation implemented by the second circuit, in particular, circuits such as those shown in FIG. 5A.

$$F(Xf) = G_0(Xh) + \sum_{i=1}^{N} G_i(Xh)m(Xp[i]) \quad (1.2)$$

Second order approximations implemented using circuits as shown in FIG. 5A are defined herein to include products of two of the small bit multipliers m(Xp[i]) and m(Xp[j]) as shown in $$F(Xf) = G_0(Xh) + \sum_{i=1}^{N} G_i(Xh)m(Xp[i]) + \quad (1.3)$$

$$\sum_{j=1}^{N2} G_{N+j}(Xh)m(Xp[P1[j]])m(Xp[P2[j]])$$

Third order approximations include products of three of the small bit multipliers as shown in $$F(Xf) = G_0(Xh) + \sum_{i=1}^{N} G_i(Xh)m(Xp[i]) + \quad (1.4)$$

$$\sum_{j=1}^{N2} G_{N+j}(Xh)m(Xp[P1[j]])m(Xp[P2[j]]) +$$

$$\sum_{j=1}^{N3} G_{N+N2+j}(Xh)m(Xp[W1[j]])m(Xp[W2[j]])m(Xp[W3[j]])$$

Implementations of the non-linear calculator 700 for log-calculator 120 built along the line of FIG. 5A have been found to be fairly efficient, as shown by some examples in Table 1. The worst case precision is measured as $-\text{Log}_2(\text{Max}[\text{abs}(f(X_f)-F(X_f))])$. The RMS precision is defined as RMS= $\sqrt{(\Sigma[f(X_f)-F(X_f)]^2)/2^{23}}$. These and following examples use logic circuit designed with the 0.15 micron Artisan standard cell library. They are designed to operate at 256 MHz and are implemented as 3 pipe stages.

| Log2 | | | | | | |
|---|---|---|---|---|---|---|
| Bit pairs | 08 | 08 | 09 | 09 | 09 | 09 |
| high address bits | 7 | 7 | 5 | 5 | 5 | 5 |
| 1st order terms | 9 = 8 + 1 | 9 = 8 + 1 | 10 = 9 + 1 | 10 = 9 + 1 | 10 = 9 + 1 | 10 = 9 + 1 |
| 2nd order terms | 00 | 08 | 07 | 08 | 08 | 08 |
| 3rd order terms | 00 | 04 | 00 | 04 | 04 | 04 |
| guard bits | 00 | 02 | 01 | 01 | 02 | 03 |
| Input Precision | 23 | 23 | 23 | 23 | 23 | 23 |
| Worst out precision | 17.023 | 21.415 | 18.533 | 19.232 | 19.541 | 19.584 |
| RMS precision | 19.095 | 24.083 | 21.606 | 22.418 | 22.620 | 22.693 |
| without registers | 1,923 | 3,607 | 3,893 | 4,352 | 4,902 | 5,099 |
| registers | 864 | 1,296 | 1,128 | 1,368 | 1,472 | 1,520 |
| total gates | 2,787 | 4,903 | 5,021 | 5,720 | 6,374 | 6,619 |
| rom bits | 12,160 | 19,840 | 5,824 | 6,496 | 7,200 | 7,904 |

Implementations of the non-linear calculator 700 for the exponential-calculator 140 are shown by some examples in Table 2.

| Exp2 | | | | | | |
|---|---|---|---|---|---|---|
| Bit pairs | 08 | 08 | 09 | 09 | 10 | 10 |
| high address bits | 7 | 7 | 5 | 5 | 3 | 3 |
| 1st order terms | 9 = 8 + 1 | 9 = 8 + 1 | 10 = 9 + 1 | 10 = 9 + 1 | 11 = 10 + 1 | 11 = 10 + 1 |
| 2nd order terms | 08 | 08 | 07 | 08 | 10 | 12 |
| 3rd order terms | 04 | 04 | 00 | 04 | 04 | 02 |
| guard bits | 02 | 03 | 01 | 02 | 01 | 01 |

-continued

| Exp2 | | | | | | |
|---|---|---|---|---|---|---|
| Input Precision | 23 | 23 | 23 | 23 | 23 | 23 |
| Worst out precision | 21.780 | 22.461 | 19.511 | 20.427 | 16.941 | 16.797 |
| RMS precision | 24.179 | 24.563 | 21.892 | 22.806 | 19.198 | 19.086 |
| without registers | 3,426 | 4,207 | 3,893 | 4,585 | 6,022 | 5,754 |
| registers | 1,072 | 1,248 | 1,128 | 1,464 | 1,392 | 2,312 |
| total gates | 4,498 | 5,455 | 5,021 | 6,049 | 7,414 | 8,066 |
| rom bits | 19,072 | 21,504 | 5,824 | 6,688 | 2,328 | 2,264 |

The inventors discovered two additional tools for improving the precision of non-linear approximations. One tool is referred to herein as an outlier-removal-circuit. The other is a mid-band-filter.

The mid-band-filter 500 provides a mid-band-corrector 506 to a non-linear calculator 700 which is added to the other additive terms in the non-linear calculator. This can be mathematically defined as follows. Given $f(X_f)$, a function to be approximated, and $F(X_f)$, an approximation of $f(X_f)$. Define a vector $\langle C_k \rangle$, whose length is preferably a power of 2, which in the examples to follow, is $2^9$. An approximation using the given approximation and the mid-band filter will be defined as $$F_1(X_f) \cong F(X_f) + m(E(X_f))C[\text{Mid}(X_f)] \quad (1.5)$$

Where $E(X_f)$ maps the top bits of $X_f$ to a range of $\{0, 1, 2, 3\}$. $\text{Mid}(X_f)$ maps some of the middle bits of $X_f$. In the examples to follow, $\text{Mid}(X_f) = \text{Int}(X_f/2^9) \& (2^9-1)$.

The outlier-removal-circuit 510 provides an outlier-corrector 516 to a given approximation $F(X_f)$, only at specific worst-case deviations, known herein as outliers. The inventors have found that for many preferred approximations, the worst deviations between $f(X_f)$ and $F(X_f)$ often occur at distinct values of $X_f$, so that by removing a small set of these deviations, the worst case deviation may be improved by a significant fraction of a bit.

FIGS. 3B to 4B shows implementations of the non-linear calculator 700 comprising at least one of a mid-band-filter 500 and/or an outlier-removal-circuit 510. The mid-band-filter 500 receives a first-part 502 of said first-part-number 702-1 and a second-part 504 of said second-part-number 702-2 to create at least one mid-band-corrector 506. The outlier-removal-circuit 510 receives said first-part-number 702-1 and said second-part-number 702-2 to create at least one outlier-corrector 516. The part-add-circuit 640 further receives at least one of said mid-band-corrector 506 and said outlier-corrector 516 to create said output-number 708.

Table 3 shows some examples of the second circuits of the log-calculator 120 and the exponential-calculator 140 implemented using implementations of the non-linear calculator 700 found in FIG. 5A, with and without implementations of a mid-band-filter 500 and/or an outlier-removal-circuit 510.

| Function | Log2 | | Exp2 | |
|---|---|---|---|---|
| N | 8 | 9 | 8 | 9 |
| N2 | 8 | 14 | 8 | 14 |
| N3 | 2 | 0 | 2 | 0 |
| Guard Bits | 2 | 5 | 3 | 5 |
| Mid-band-filter | No | 3K bits | No | 2K bits |
| Outlier-removal | 0 | About 200 gates | 0 | 0 |
| Worst Precision | 21.415 bits | 24 | 22.46 | 24.23 |
| W/Out registers | 3,609 gates | 8,175 | 4,207 | 7,542 |
| Registers | 1,296 gates | 4,008 | 1,248 | 3,896 |
| Total Gates | 4,905 | 12,183 | 5,455 | 11,438 |
| Total Table Bits | 19,840 | 21,312 | 21,504 | 19,520 |

The precision requirements were verified for every input using models built in C. Logic circuits implementing these approximations are shown to have practical table sizes and gate counts based upon the Artisan 0.15 μm standard cell library, operating at 256 MHz. The circuits were modeled in VHDL. Other numeric experiments were performed using the mid-band correct filters on optimized second order approximators of log 2 and exp2. With the use of outlier correction circuits, we found approximators with better than 28.6 bits worst case precision, and table sizes of about 85 K bits.

Figure 2G:
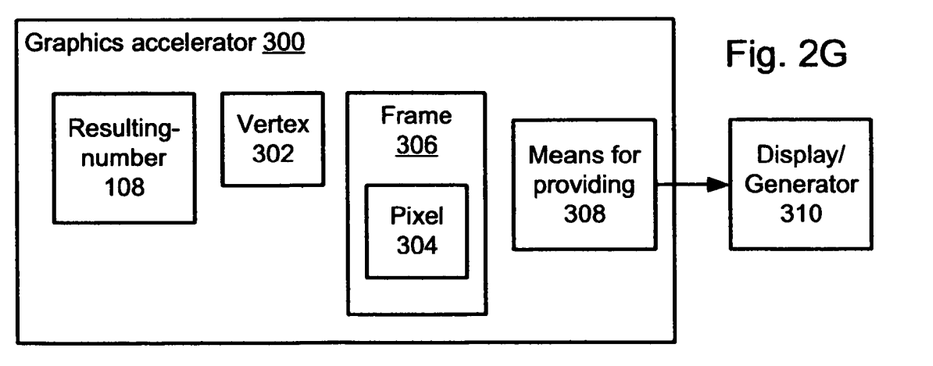
FIG. 2G shows a graphics accelerator including the resulting number.
Figure 3A:
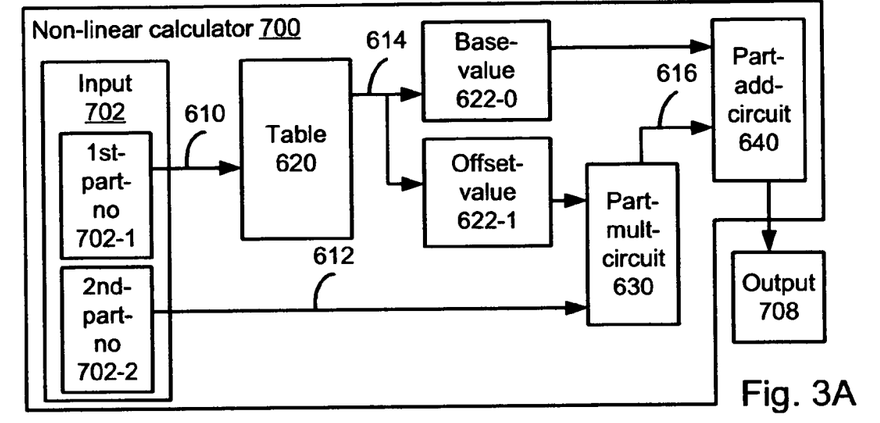
Figure 3B:
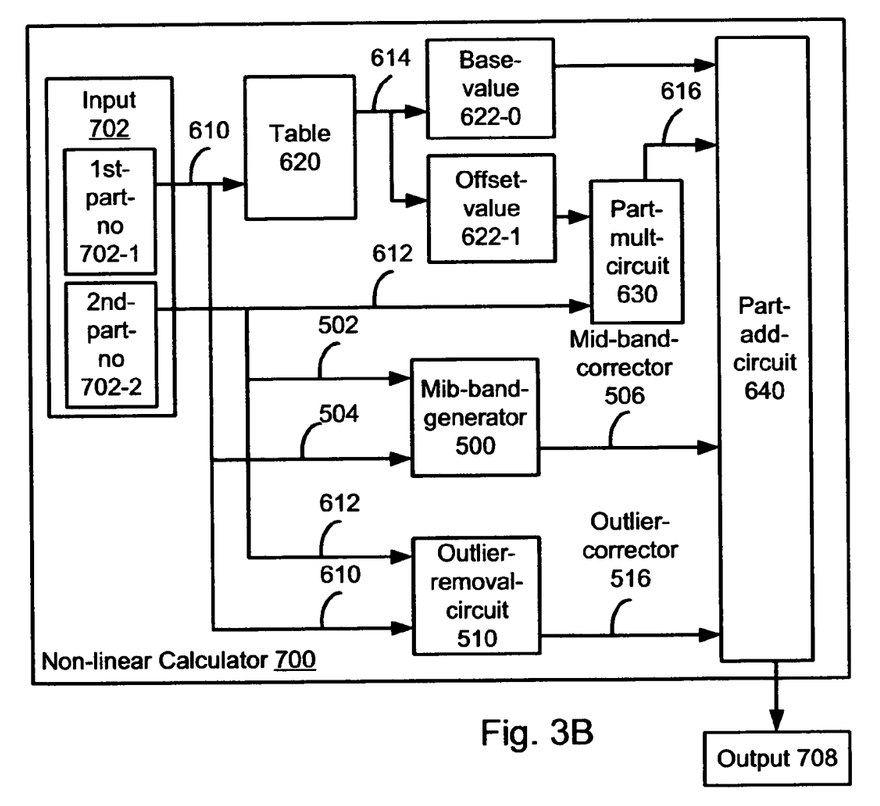
Figure 4A:
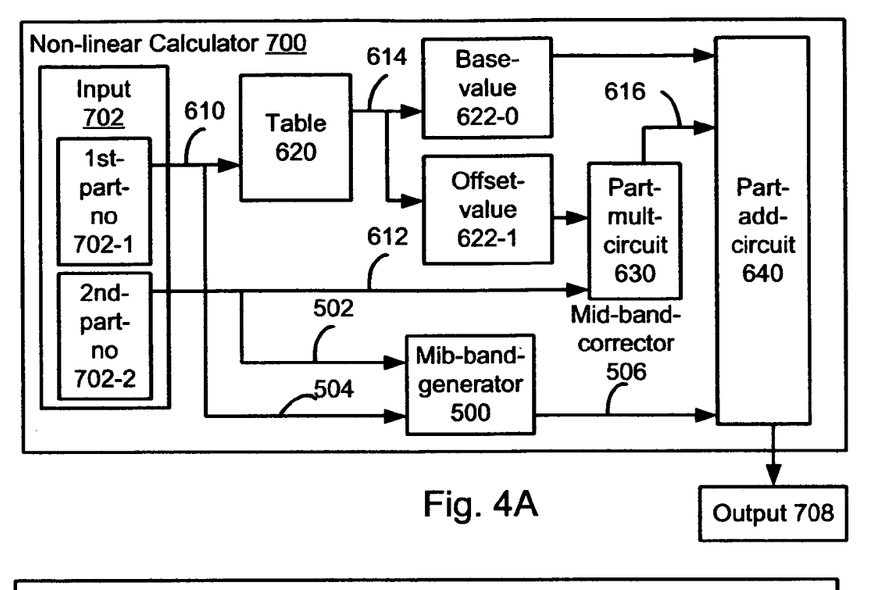
Figure 4B:
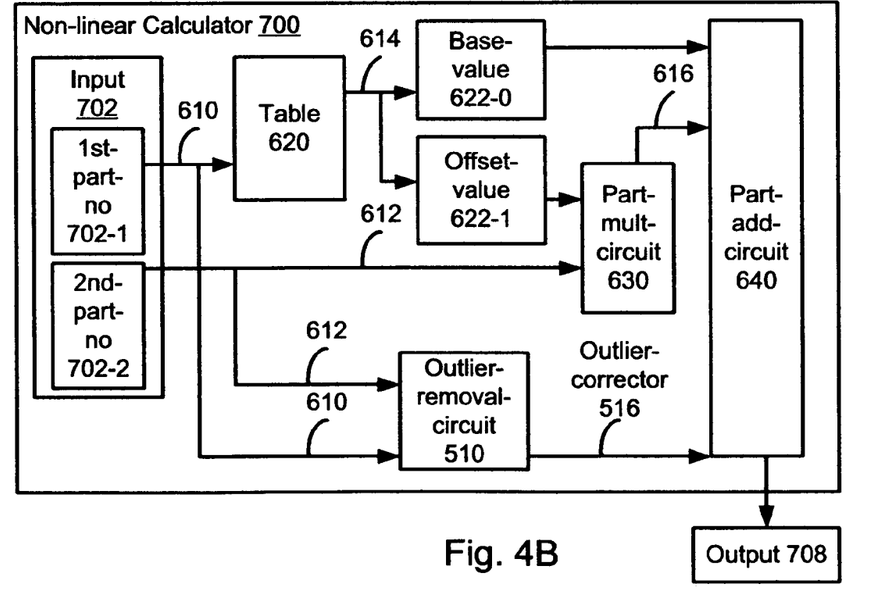

The invention includes using said resulting-number 108 in a graphics accelerator 300 as shown in FIG. 2G. This use may include using said resulting-number to create at least part of a vertex 302, and/or using at least one of said resulting-number and said vertex to create at least part of a pixel 304 included in a frame 306. The graphics accelerator 300 also includes a means for providing 308 the frame for visual presentation, preferably by a display/generator 310.

The frame 306 includes at least one of a one-dimensional array of at least two of said pixel 304, a two-dimensional array of said pixels, and/or a three-dimensional array of said pixels. The means for providing 308 the frame to the display/generator preferably performs at least one of the following. Providing said frame to a two-dimensional display, providing said frame to a three-dimensional display, providing said frame to at least two of said two-dimensional displays, providing said frame to at least two of said three-dimensional displays, and/or providing said frame to a holographic display generator.

Further discussion of various embodiments of the arithmetic circuit 100 with regards to their use in graphics accelerators is found in the following provisional applications, which have been incorporated by reference: "Summary of the Invention", and "Detailed description of the Figures" in Ser. No. 60/470,100; "Throughput Comparison", "Opportunities for Extending Graphics Languages", and "Conclusion" in 60/536,745; from "Compiler-Friendly Datapath Architecture Principles" through "Performance Comparison" in 60/562,493.

Figure 6A:
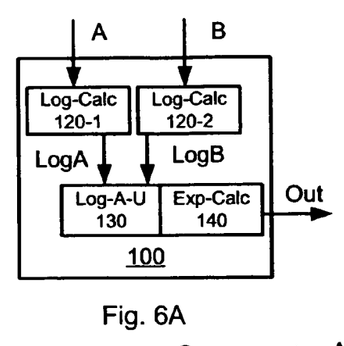
Figure 6B:
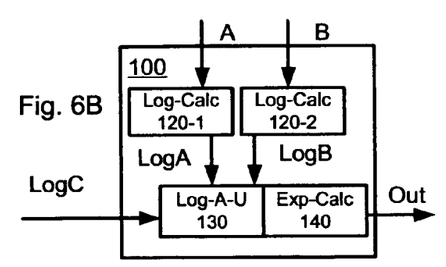
Figure 6C:
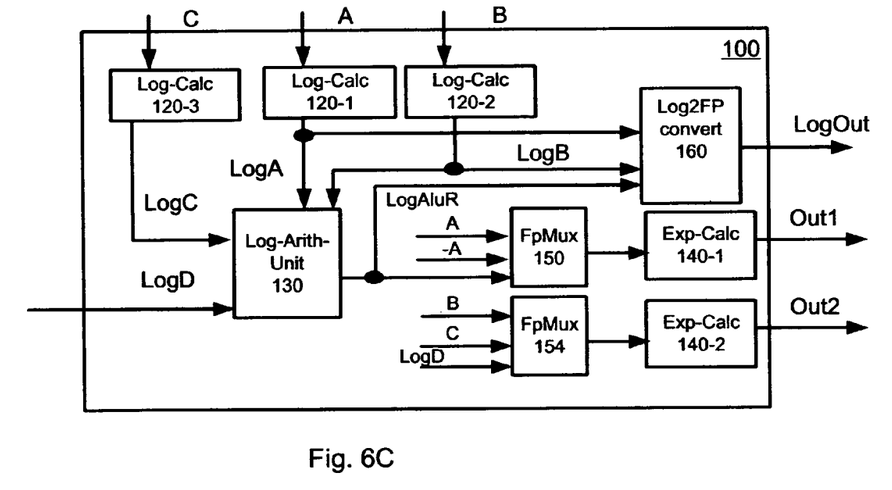
Figure 6D:
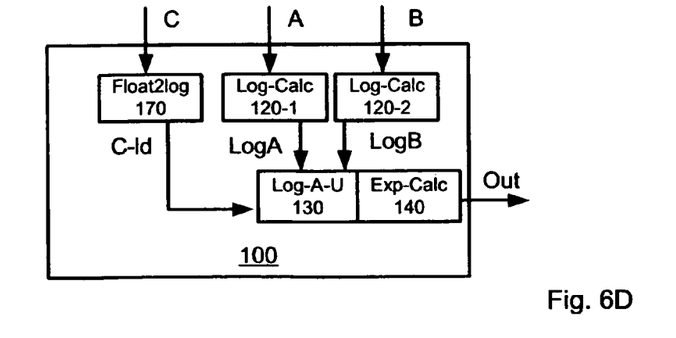
Figure 7:
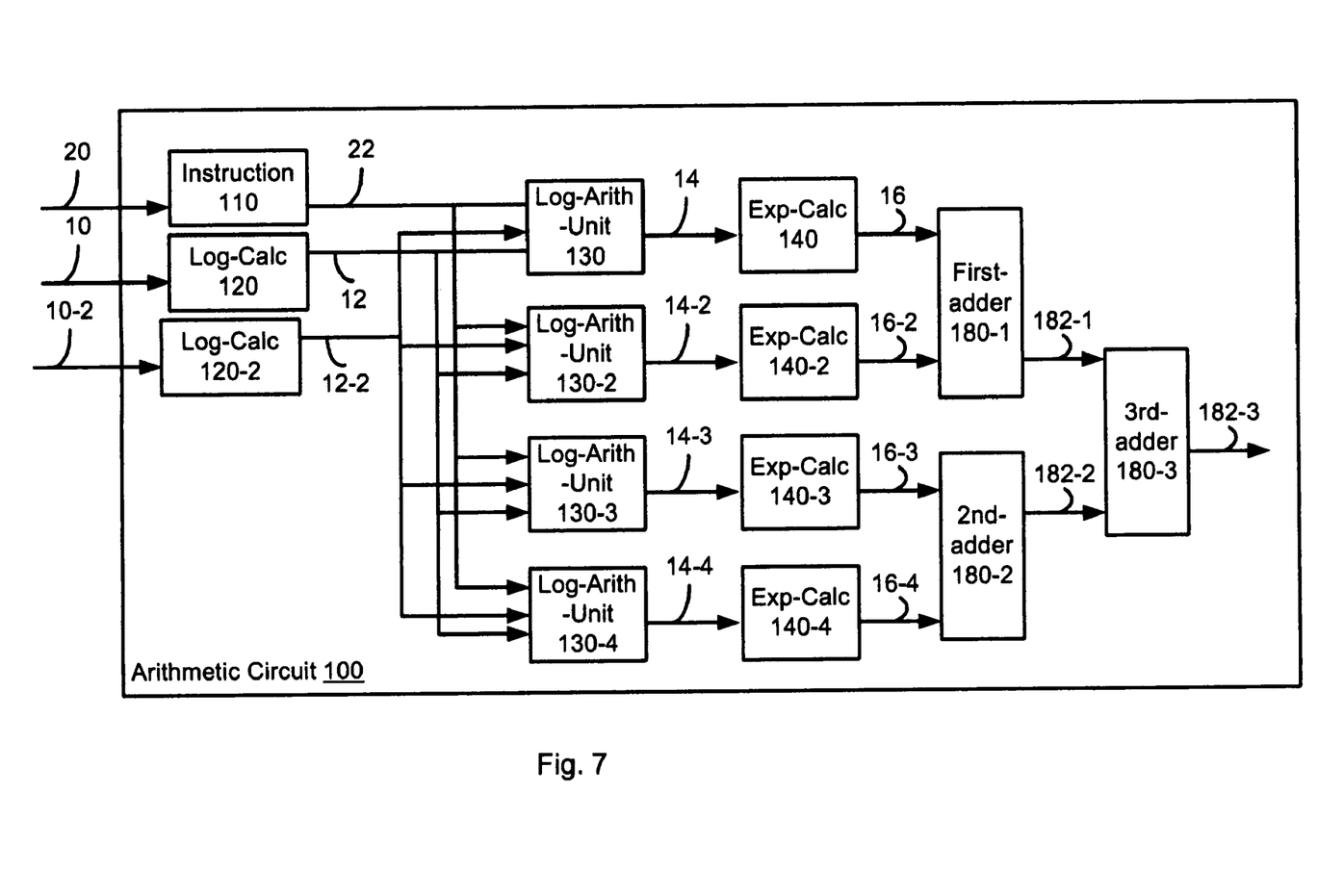

FIGS. 6A to 7 show examples of various embodiments of the arithmetic circuit 100 of FIG. 1A further including at least one of a floating-point-to-log-converter 170, a second log-calculator 120-2, and/or a log-to-floating-point-converter 160. Note in that some embodiments, at least one the log-calculator 120, the log-arithmetic-unit 130 and/or the exponential-calculator 140 may include a multiplexer selecting a limited collection of inputs for that circuit.

In particular, FIG. 7 shows an example of the arithmetic circuit 100 of 1A further including more log-arithmetic-units and exponential-calculators. This example circuit provides a capability for calculating the active terms of range limited approximations of sine and cosine as discussed in "Example of polynomial calculation" in Ser. No. 60/562,493. This circuit is also capable of providing the numeric products involved of a complex number provided by couplings 10 and 10-2 as the resulting numbers 16, 16-2, 16-3, and 16-4. The adders 180-1 and 180-2 provide the real and imaginary components of that complex product. The other complex number used in the product is made available in the log-domain to the log-arithmetic-units in a fashion similar to that shown in FIGS. 6B and 6C. These log-domain numbers may preferably be locally stored in the log-domain format for use with the log-arithmetic-units.

The preceding examples and embodiments of the invention have been provided by way of example, and are not meant to constrain the scope of the invention.

What is claimed is:

1. A method comprising the step of
operating an arithmetic circuit approximating one of a square-root of a number, a reciprocal of said number, and a reciprocal-square-root of said number to create a resulting-number, comprising the steps of:
an said arithmetic circuit receiving said number and an instruction to create said resulting-number, further comprising the steps of
a log-calculator receiving said number to create a log-domain-number containing a fixed-point-part and asserting a negative infinity indicator when said number is the zero-number;
a log-arithmetic-unit receiving said log-domain-number and said instruction to create an altered-log-domain-number containing a second of said negative infinity indicator set as said negative infinity indicator contained in said log-domain-number when said instruction indicates a log-shift-down; and
an exponential-calculator receiving said altered-log-domain-number to create
said resulting-number as said zero-number when said altered-log-domain-number contains said second negative infinity indicator as asserted and
when said instruction indicates a log-shift-down, said resulting-number approximating said square-root of said number.

2. A method of claim 1, wherein the step operating said log-arithmetic-unit, further comprises the steps of:
shifting said fixed-point-part of said log-domain-number to at least partly create a fixed-point-part of said altered-log-domain-number when said instruction indicates said log-shift-down;
negating said fixed-point-part of said log-domain-number to at least partly create said fixed-point-part of said altered-log-domain-number when said instruction indicates a log-negate; and
shifting and negating said fixed-point-part of said log-domain-number to at least partly create a fixed-point-part of said altered-log-domain-number when said instruction indicates said log-shift-down and when said instruction indicates said log-negate.

3. The method of claim 2, wherein when said instruction indicates a dual-number-mode,
said number represents a first-sub-number and a second-sub-number, and
said resulting-number represents a first-resulting-number and a second-resulting-number;
wherein when said instruction indicates said dual-number-mode and when said instruction indicates said log-shift-down,
said first-resulting-number approximates said square-root of said first-sub-number, and
said second-resulting-number approximates said square-root of said second-sub-number;
wherein when said instruction indicates said dual-number-mode and when said instruction indicates said log-negate,
said first-resulting-number approximates said reciprocal of said first-sub-number, and
said second-resulting-number approximates said reciprocal of said second-sub-number; and
wherein when said instruction indicates said dual-number-mode and when said instruction indicates said log-shift-down and when said instruction indicates said log-negate,
said first-resulting-number approximates said reciprocal-square-root of said first-sub-number, and
said second-resulting-number approximates said reciprocal-square-root of said second-sub-number.

4. The method of claim 1, wherein at least one of said number and said resulting-number is a floating-point-format-number.

5. The method of claim 4, wherein both said number and said resulting-number is a floating-point-format-number.

6. The method of claim 5, wherein said number includes a mantissa, said resulting-number includes a resulting-mantissa, and the bit-size of said mantissa is the same as the bit-size of said resulting mantissa.

7. The method of claim 1, wherein said resulting-number is produced.

8. A method of using said resulting-number of claim 1 in a graphics accelerator, comprising at least one of the steps of:
using said resulting-number to create at least part of a vertex;
using at least one of said resulting-number and said vertex to create at least part of a pixel included in a frame; and
said method further comprising the step of: providing said frame for visual presentation.

9. The method of claim 8, wherein said frame includes at least one of
a one-dimensional array of at least two of said pixel;
a two-dimensional array of said pixels; and
a three-dimensional array of said pixels.

10. The method of claim 8, wherein the step providing said frame further comprises at least one of the steps of:
providing said frame to a two-dimensional display;
providing said frame to a three-dimensional display;
providing said frame to at least two of said two-dimensional displays;
providing said frame to at least two of said three-dimensional displays; and
providing said frame to a holographic display generator.

11. An apparatus, comprising:
an arithmetic circuit configured to receive a number and an instruction to create a resulting-number as an approximation of a square-root of said number, comprising
a log-calculator configured to receive said number to create a log-domain-number containing a fixed-point-part and asserting a negative infinity indicator when said number is the zero-number;
a log-arithmetic-unit configured to receive said log-domain-number and said instruction to create an alteredlog-domain-number containing a second of said negative infinity indicator set as said negative infinity indicator contained in said log-domain-number when said instruction indicates a log-shift-down; and an exponential calculator configured to receive said altered-log-domain-number to create said resulting-number as said zero-number when said altered-log-domain-number contains said second negative infinity indicator as asserted.

12. The apparatus of claim 11, wherein said log-calculator comprises a first implementation of a non-linear calculator receiving an input-number derived from said number to create an output-number including said fixed-point-part; and wherein said exponential-calculator comprises a second implementation of said non-linear calculator receiving said input-number derived from said altered-log-domain-number to create an output-number included in said resulting-number.

13. The apparatus of claim 12, wherein at least one of said first-implementation and said second implementation of said non-linear calculator, comprises:

at least one table accessed by a first-part-number included in said input-number to create at least one offset-value and a base-value;

a part-mult-circuit receiving said offset-value and a second-part-number, included in said input-number, to create at least one scaled-part-value;

a part-add-circuit receiving said base-value and said at least one scaled-part-value to create said output-number.

14. The apparatus of claim 12, wherein non-linear calculator, further comprises at least one of:

a mid-band-filter receiving a first-part of said input-number and a second-part of said input-number to create at least one mid-band-corrector; and an outlier-removal-circuit receiving said input-number to create at least one outlier-corrector; and wherein said part-add-circuit further receiving at least one of said mid-band-corrector and said outlier-corrector to create said output-number.

15. The apparatus of claim 14, wherein said mid-band-filter, comprises:

a corrector-vector accessed by said first-part to create a corrector-value; and a corrector-small-scaler receiving said corrector-value and said second-part to create said mid-band-corrector.

16. The apparatus of claim 14, wherein said outlier-removal-circuit, comprises:

an outlier-selector receiving said input-number to create at least one outlier-selector-signal; and an outlier-generator receiving each of said outlier-selector-signals to assert said corrector-value distinctly from zero.

17. A method of making said arithmetic circuit of claim 11, comprising the steps of:

making said log-calculator first-receiving said number to create said log-domain-number containing said fixed-point-part;

making said log-arithmetic-unit receiving said log-domain-number and said instruction to create said altered-log-domain-number; and making said exponential-calculator receiving said altered-log-domain-number to create said resulting-number.

18. The method of claim 17, comprising at least one of the steps of:

using at least one field-programmable-gate-array to create at least one of said arithmetic circuit, said log-calculator, said log-arithmetic-unit, and said exponential-calculator;

using at least one gate-array-layout-template to create at least one of said arithmetic circuit, said log-calculator, said log-arithmetic-unit, and said exponential-calculator; and using a standard-cell-process to create at least one of said arithmetic circuit, said log-calculator, said log-arithmetic-unit, and said exponential-calculator.

19. At least one of said arithmetic circuit, said log-calculator, said log-arithmetic-unit, and said exponential-calculator as products of the process of claim 17.

20. The apparatus of claim 11, further comprising at least one of:

a floating-point-to-log-converter receiving a second-number to create a second-log-domain-number; and a second of said log-calculators receiving a third-number to create a third-log-domain-number;

wherein said log-arithmetic-unit further comprises: said log-arithmetic-unit further receiving at least one of said second-log-domain-number and said third-log-domain-number to further create said altered-log-domain-number;

wherein a log-domain-input-number list includes as members said log-domain-number, said second-log-domain-number, and said third-log-domain-number.

21. The apparatus of claim 20, further comprising: a log-to-floating-point-converter receiving at least one member of said log-domain-input-number list to create a second-resulting-number.

22. The apparatus of claim 20, further comprising: a second log-arithmetic-unit receiving at least one of the log-domain-input-number list to create a second altered-log-domain-number, provided to a second exponential-calculator to create a third-resulting-number.

23. The apparatus of claim 22, further comprising:

a third of said log-arithmetic-units receiving at least one of said log-domain-input-number list to create a third-altered-log-domain-number, provided to a third of said exponential-calculators to create a fourth-resulting-number; and a fourth of said log-arithmetic-units receiving at least one of the log-domain-input-number list to create a fourth-altered-log-domain-number, provided to a fourth of said exponential-calculator to create a fifth-resulting-number;

wherein the resulting-number list includes as members said resulting-number, said second-resulting-number, said third-resulting-number, said fourth-resulting-number, said fifth-resulting-number.

24. The apparatus of claim 23, further comprising:

a first adder receiving at least two of said members of said resulting-number-list to create a first-adder-result; and a second adder receiving at least two of said members of said resulting-number-list to create a second-adder-result; and a third adder receiving at least said first-adder-result and said second-adder-result to create a third-adder-result.

25. The apparatus of claim 24, wherein said third-adder-result provides a range-limited approximation of at least one of a sine-function and a cosine-function of said number.

26. The apparatus of claim 20, further comprising: a third of said log-calculators receiving a fourth-number to create a fourth-log-domain-number;
    wherein said log-arithmetic-unit further comprises: said log-arithmetic-unit further receiving of said fourth-log-domain-number to further create said altered-log-domain-number.

27. The apparatus of claim 26, wherein said resulting-number approximates a multiplication of said number, said third-number and said fourth-number.

* * * * *